(12) United States Patent
Perrin et al.

(10) Patent No.: US 7,983,634 B2
(45) Date of Patent: Jul. 19, 2011

(54) RADIO TELECOMMUNICATION TERMINAL AND A METHOD OF DECREASING PERTURBATIONS WITHIN THIS TERMINAL

(75) Inventors: Jean-Phillipe Perrin, Seoul (KR); Jean-Claude Bini, Vence (FR)

(73) Assignee: ST-Ericsson SA, Geneva (CH)

( * ) Notice: Subject to any disclaimer, the term of this patent is extended or adjusted under 35 U.S.C. 154(b) by 530 days.

(21) Appl. No.: 12/162,158

(22) PCT Filed: Jan. 22, 2007

(86) PCT No.: PCT/IB2007/050215
§ 371 (c)(1),
(2), (4) Date: Jul. 25, 2008

(87) PCT Pub. No.: WO2007/085998
PCT Pub. Date: Aug. 2, 2007

(65) Prior Publication Data
US 2009/0011724 A1    Jan. 8, 2009

(51) Int. Cl.
*H04B 1/04* (2006.01)
(52) U.S. Cl. .................. 455/114.1; 455/67.11; 455/296
(58) Field of Classification Search .... 455/114.1–114.3, 455/67.11–67.14, 296
See application file for complete search history.

(56) References Cited

U.S. PATENT DOCUMENTS

| | | |
|---|---|---|
| 5,926,514 A | 7/1999 | Meador et al. |
| 2001/0029189 A1* | 10/2001 | Mandyam ................. 455/67.1 |
| 2006/0270375 A1* | 11/2006 | Beamish et al. ............. 455/311 |
| 2007/0071114 A1* | 3/2007 | Sanderford et al. ....... 455/226.1 |

FOREIGN PATENT DOCUMENTS

| | | |
|---|---|---|
| WO | 02078201 A | 10/2002 |
| WO | 2005093969 A | 10/2005 |

OTHER PUBLICATIONS

Lindoff B; "Using a Direct Conversion Receiver in Edge Terminals—A New DC Offset Compensations Algorithm". Personal, Indoor and Mobile Radio Communications, 2000. PIMRC 2000. London, GB. vol. 2, p. 959-963, Aug. 6, 2002.

* cited by examiner

*Primary Examiner* — Lana N Le
(74) *Attorney, Agent, or Firm* — William J. Kubida; Hogan Lovells US LLP

(57) ABSTRACT

The radio telecommunication terminal (2) comprises a data burst scheduler able to schedule the continuous transmission of consecutive data bursts which generate noise of similar energy on the radio-frequency channel as long as a specific radio-frequency channel is used to receive a radio signal, the respective energy of the noise generated by the transmission of two consecutive first and second data burst being similar only if the noise energy gradient between the end of the transmission of the first data burst and the beginning of the transmission of the second data burst is situated between predetermined upper and lower limits.

10 Claims, 3 Drawing Sheets

RADIO TELECOMMUNICATION TERMINAL AND A METHOD OF DECREASING PERTURBATIONS WITHIN THIS TERMINAL

FIELD OF THE INVENTION

The present invention relates to a radio telecommunication terminal and a method of decreasing perturbations within this terminal.

BACKGROUND OF THE INVENTION

There exist radio-telecommunication terminals having:

a radio-frequency transceiver section able to receive a radio signal transmitted on a radio-frequency channel and to transform the received radio signal into a baseband signal, the radio-frequency transceiver section having a noise cancellation module able to efficiently cancel noise on the radio-frequency channel only if the noise energy gradient remains between a predetermined lower and upper limit, a baseband section to process the baseband signal, the baseband section having at least a digital data bus, two electronic circuits that transmit data bursts through the bus, and a bus manager able to indicate that the bus is busy as long as a data burst is being transmitted and to indicate that the bus is free for the transmission of a new data burst from the end of the previous data burst transmission, each data burst transmission generating noise of constant energy on the radio-frequency channel.

A data burst is a temporal succession of binary data to be transmitted as a single block of information. Thus, during the transmission of a data burst, the bus manager continuously indicates that the bus is busy from the beginning of the data burst transmission to the end of the data burst transmission. As a result, the transmission of a data burst cannot be interrupted to transmit another data burst from another circuit.

For example, a data burst occurs when a circuit reads or writes data in a set of consecutive addresses in a memory.

During a data burst transmission, the information is transmitted over the bus by changing bus wire levels from high to low level and vice-versa in synchronism with a bus clock. This transition from high to low level and from low to high level generates noise at frequencies that depend on the bus clock frequency. Generally, the generated noise occurs at harmonic frequencies of the bus clock frequency.

For example, in GSM (Global System for Mobile Communications) the bus between a baseband processor and an external memory is clocked at 13 MHz. Consequently, a data burst transmission generates noise at 936 MHz that is the $72^{th}$ harmonic of 13 MHz. The noise at 936 MHz is within the frequency band of the radio-frequency channel at 900 MHz (this channel is known as "channel 5" in GSM mobile phones) and disrupts this channel.

More precisely, the noise generated during the transmission of data bursts is either radiated from the bus wires to an antenna connected to the radio-frequency transceiver section or conducted to the radio-frequency transceiver section through conductors like power or ground conductors. As a result, in a power density spectrum of the received radio signal, this generated noise appears as a parasitic power peak of constant amplitude or as a constant offset of the amplitude of the main power peak of the received radio signal. In this last case, the offset caused by the noise is known as "DC offset".

As long as the energy of the generated noise does not rapidly vary with time, the noise cancellation module is able to efficiently cancel this noise.

However, the applicant has noted that the noise energy abruptly decreases at the end of the data burst transmission and abruptly increases at the beginning of the burst data transmission because the bus shifts from an idle state to a busy state and vice-versa. Therefore, the noise cancellation module is not permanently efficient to cancel the noise generated by data burst transmissions.

Many solutions have been proposed to solve this problem. For example, adjusting the bus clock frequency to offset the noise from the radio-frequency channel is disclosed in U.S. Pat. No. 5,926,514 in the name of Meador et al. It has also been proposed:

a) to reduce the noise in the baseband section, or b) to reinforce the shielding between the baseband section and the radio-frequency transceiver section.

Solution a) is not suitable because it goes against the trend to have more powerful circuits in the baseband section.

Solution b) is not suitable either, because it goes against the trend of miniaturization.

SUMMARY OF THE INVENTION

Accordingly, it is an object of the invention to provide a radio telecommunication terminal in which the perturbation of the radio-frequency transceiver section due to noise generated in the baseband section is reduced without the need for a baseband section noise reduction or a shielding reinforcement.

With the foregoing and other objects in view there is provided in accordance with the invention a radio telecommunication terminal wherein the baseband section includes a data burst scheduler able to schedule the continuous transmission of consecutive data bursts which generate noise of similar energy on the radio-frequency channel as long as the radio-frequency channel is used to receive the radio signal, the respective energy of the noise generated by the transmission of two consecutive first and second data bursts being similar only if the noise energy gradient between the end of the transmission of the first data burst and the beginning of the transmission of the second data burst is situated between the upper and lower limits.

In the above terminal, the scheduler causes the energy gradient of the noise generated by the bus to remain within the predetermined limits acceptable for the noise cancellation module. Thus, the noise cancellation is continuously efficient as long as the radio-frequency channel is used to receive the radio signal. As a consequence, the perturbation of the radio-frequency transceiver section due to noise generated by the baseband section is lowered without the need to lower the energy of the noise generated by the baseband section and without the need for a shielding reinforcement between the baseband section and the radio-frequency transceiver section.

The embodiments of the above terminal may comprise one or several of the following features:

the baseband section comprises a dummy data generator able to produce a dummy data burst which generates noise of similar energy to the nose of a real data burst when transmitted through the bus, and wherein the scheduler is designed to stuff time intervals during which there is no real data burst to be transmitted with dummy data burst transmissions so as to prevent abrupt drop or rise of noise energy at the end or at the beginning of a real data burst transmission as long as the radio-frequency channel is used to receive the radio signal, the bus manager is able to generate control signals during the transmission of dummy data bursts that indicate to the electronic circuits that the transmitted data are dummy data, the scheduler is designed to always schedule the transmission of real data bursts prior to the transmission of dummy data bursts, and the scheduler is designed to stop scheduling continuous transmission of consecutive data bursts as soon as radio-frequency channels that are disrupted by the noise generated by the data burst transmissions are no longer used to receive the radio signal.

The above embodiments of the terminal offer the following advantages:

using dummy data transmission ensures that the scheduler will always be able to continuously transmit consecutive data bursts even if the circuits have no more real data bursts to transmit, indicating to the electronic circuits that dummy data bursts are transmitted prevents these circuits from confusing dummy data with real data and avoids unpredictable behavior of those circuits, transmitting real data bursts prior to dummy data bursts speeds up the data transmission through the bus, and disabling the continuous transmission of data bursts when it is no longer necessary saves energy because production and transmission of dummy data bursts can be avoided.

The invention also relates to a method of decreasing the perturbation of a radio-frequency transceiver section caused by a baseband section in the above terminal, this method including the step of scheduling the continuous transmission of consecutive data bursts which generate noise of similar energy on the radio-frequency channel as long as the radio-frequency channel is used to receive the radio signal, the respective energy of the noise generated by the transmission of two consecutive first and second data bursts being similar only if the noise energy gradient between the end of the transmission of the first data burst and the beginning of the transmission of the second data burst is situated between the upper and lower limits.

The embodiments of the above method may comprise one or several of the following features:

the step of producing dummy data bursts, which generates noise of similar energy to that of a real data burst when transmitted through the bus, and the step of stuffing time intervals during which there is no real data burst to be transmitted with dummy data burst transmissions so as to prevent abrupt drop or rise of noise energy at the end or at the beginning of a real data burst transmission as long as the radio-frequency channel is used to receive the radio signal, the step of signaling the transmission of dummy data bursts to the electronic circuits.

the step of prioritizing the transmission of the data bursts and to always assign the lowest priority to the dummy data bursts.

the step of terminating the step of scheduling the continuous transmission of consecutive data bursts as soon as no radio-frequency channel susceptible to be disrupted by noise generated during the data burst transmission is used to receive the radio signal.

These and other aspects of the invention will be apparent from the following description, drawings and claims.

DESCRIPTION OF THE PREFERRED EMBODIMENTS

Figure 1:
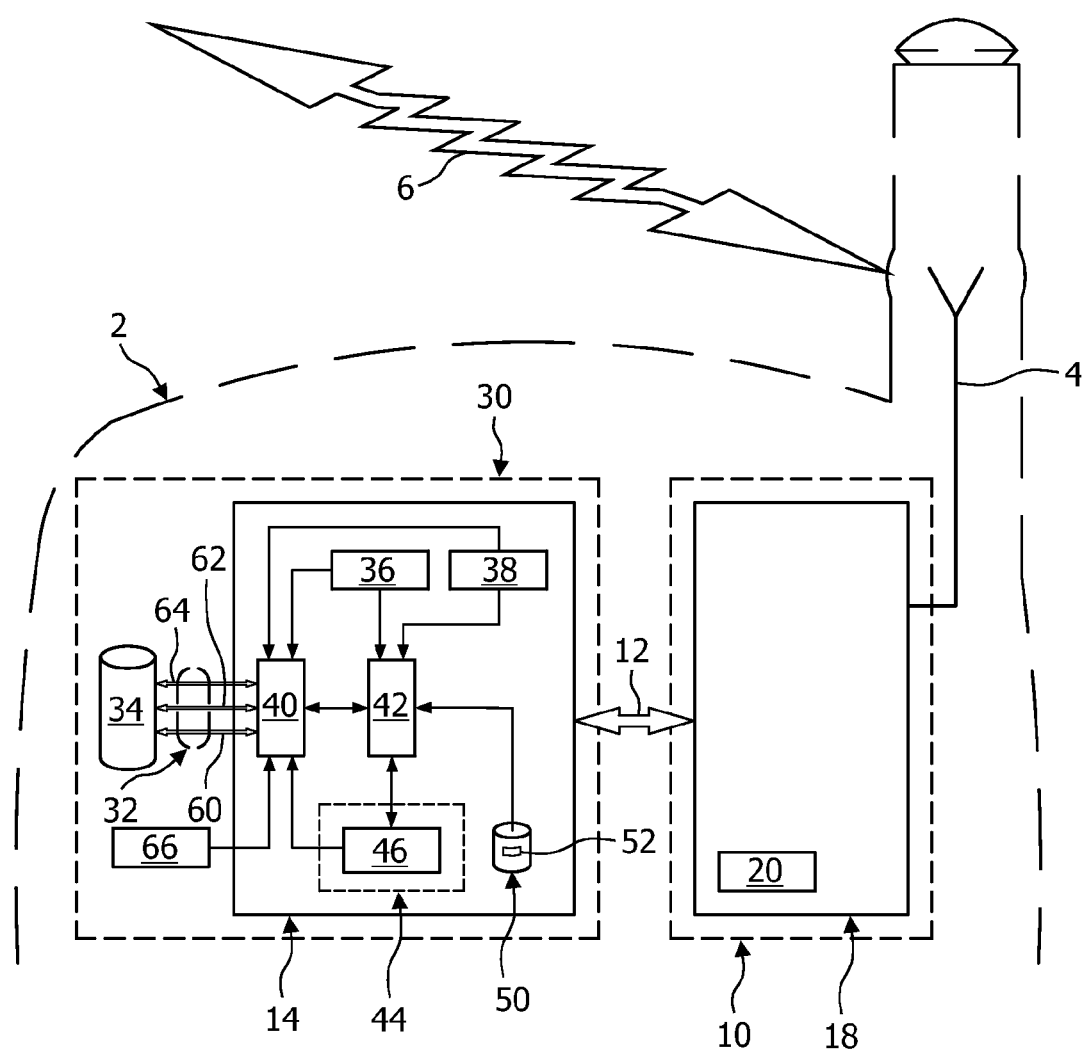
FIG. 1 is a schematic diagram of a radio telecommunication terminal.

FIG. 1 shows a radio telecommunication terminal 2. Terminal 2 is for example a mobile phone like a GSM mobile phone.

In the following description, well-known functions or constructions by a person of ordinary skill in the art are not described in detail.

Terminal 2 has an antenna 4 to receive a radio signal 6.

Antenna 4 is connected to a radio-frequency transceiver section 10 that converts the radio signal 6 into a baseband signal transmitted through a bus 12 to a baseband section 14. Baseband section 14 is designed to process the received baseband signal.

More precisely, section 10 includes a radio-frequency transceiver 18 connected between antenna 4 and bus 12 to demodulate the radio signal received on a predetermined radio-frequency channel and to transmit through bus 12 the corresponding baseband signal. Typically, transceiver 18 is able to receive radio signals on different radio-frequency channels. To this end, transceiver 18 can be tuned to receive a radio signal on only one of a plurality of possible radio-frequency channels.

Transceiver 18 has a noise cancellation module 20 to cancel noise on the radio-frequency channel currently used to receive the radio signal. Module 20 is able to discriminate noise from the radio signal only if the energy of the noise has not varied rapidly in time. In other words, module 20 is able to efficiently cancel the noise only if the noise energy gradient remains between a lower and an upper limit $S_L$ and $S_H$ respectively.

For the purpose of illustration, the energy of the noise can be calculated according to the following relation:

$$P = \frac{1}{T} \int_O^T N(t)^2 \, dt \quad (1)$$

where:

T is a time interval that is equal to the duration of a time slot in a GSM (Global System for Mobile Communications), for example N(t) is the noise received by the antenna 4 and measured at the output of a filter that rejects any frequencies outside the radio-frequency channel, and t is the time.

Limits $S_L$ and $S_H$ are determined experimentally. For example, limits $S_L$ and $S_H$ can be chosen so that $|S_L\ S_H|$ is smaller than 10% of the average power of the received signal.

For example, such a module 20 uses known DC offset filtering algorithms. For example, such an algorithm is disclosed in "Using a direct conversion receiver in edge terminals—a new DC offset compensation algorithm" (Bengt LINDOFF—Research Ericsson Mobile Communications AB, Sweden).

For the purpose of illustration, section 14 includes a baseband processor 30 connected through an external bus 32 to an external memory 34.

Baseband processor 30 is connected to bus 12 to receive the baseband signal in order to process it.

Processor 30 includes different on-chip modules that need to write data in or to read data from memory 34 through bus 32. Thus, these on-chip modules are able to trigger and to produce real data bursts. In the following description, "real data" means that the transmitted data are needed to process the baseband signal or to produce a baseband signal that is transmitted to transceiver 18. In contrast, the term "dummy data" qualifies data that are useless for the baseband processing of any kind of signal. In particular, such dummy data are useless for the processing of the baseband signal received from or transmitted to transceiver 18.

For simplicity, only two such on-chip modules 36 and 38 are shown in FIG. 1.

Modules 36 and 38 are connected to an on-chip bus manager 40 and to an on-chip scheduler 42.

Bus manager 40 is a state machine that is able to manage and control transmissions and receptions of data bursts through bus 32. During a transmission or a reception of a data burst, manager 40 is able to indicate to scheduler 42 that the bus is busy. On the contrary, at the end of a data burst transmission, manager 40 is able to indicate to scheduler 42 that bus 32 is going to be free. Manager 42 receives data and addresses directly from modules 36 and 38.

Scheduler 42 is able to schedule the transmission and the reception of data bursts over bus 32 according to the indication received from manager 40.

Furthermore, scheduler 42 is able to trigger the production of dummy data bursts by an on-chip dummy data burst generator 44. Generator 44 is able to produce a dummy data burst that generates noise when transmitted through bus 32 with energy similar to the noise energy of the immediately preceding real data burst transmission. Herein, the noise generated by a data burst transmission is said to be "similar" to the noise energy of an immediately preceding data burst transmission if the noise energy gradient between the end of the immediately preceding data burst transmission and the beginning of the following data burst transmission is situated between upper and lower limits $S_L$ and $S_H$.

For example, generator 44 includes a random or pseudo-random generator 46 that generates random addresses and/or random data so as to produce a dummy data burst.

Generator 44 is connected to manager 40 to transmit the generated dummy data bursts and to indicate to manager 40 that the received data bursts are dummy data bursts.

Scheduler 42 is also connected to an on-chip memory 50 containing a table 52. Table 52 is a list containing only the identifiers of radio-frequency channels that are susceptible to be disrupted by the noise generated by bus 32 when data bursts are transmitted from processor 30 to memory 34 or vice-versa.

Table 52 is predetermined and established from experimentation.

For illustration, bus 32 includes a control bus 60, a data bus 62 to transmit data and an address bus 64 to transmit addresses. Each of the buses 60 to 64 is made of parallel wires connected at one end to manager 40 and at the other end to memory 34. Typically, each one of data bus 62 and address bus 64 includes more than eight parallel wires. The voltage on each of the wire can be set to a high level and a low level under the control of manager 40. The transitions between high and low levels are clocked according to a clock signal generated by a clock 66. For example, the clock signal has a frequency $f_K$ of 13 MHz. In this respect, the time interval T of relation (1) is chosen several times greater than $$\frac{1}{f_K}$$

and preferably chosen to be more than 100 times $$\frac{1}{f_K}.$$

Memory 34 is a read/write memory like a RAM (Random Access Memory) or a ROM (NORFLASH or NAND-FLASH).

Figure 2:
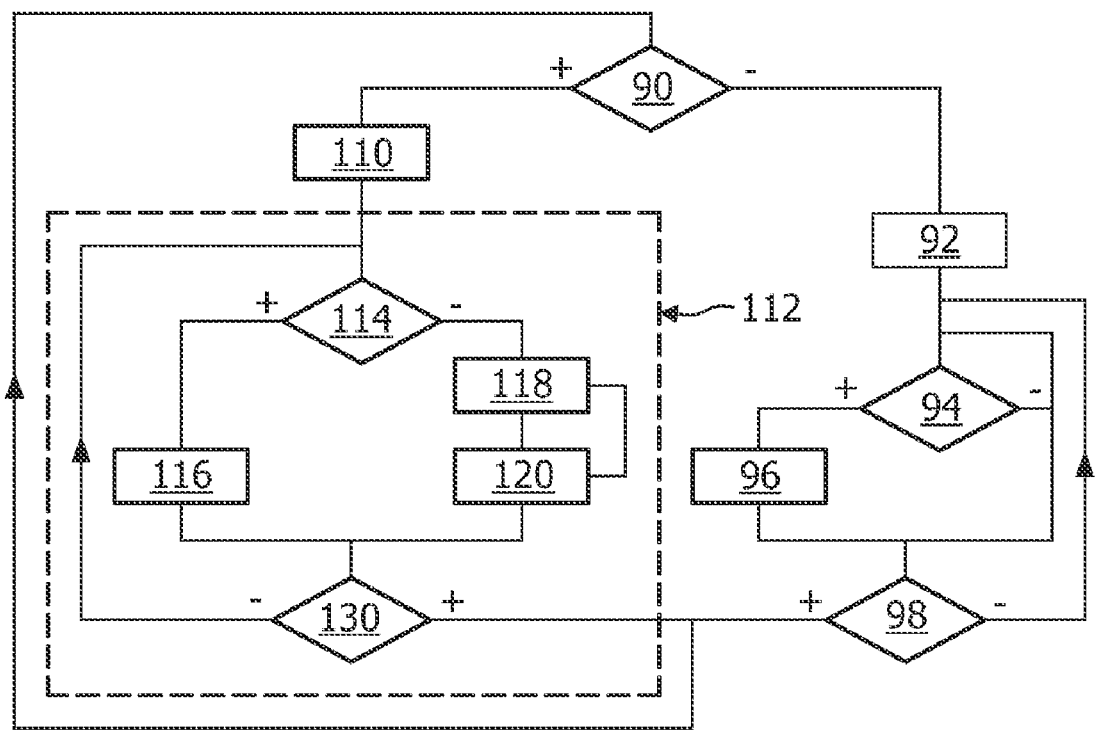
FIG. 2 is a flowchart of a method of decreasing the perturbation of a radio-frequency transceiver section caused by a baseband section in the terminal of FIG. 1, FIGS. 3A and 3B are timing charts of data burst transmissions and of the corresponding DC contributions.

More details on the functions of the different elements of sections 10 and 14 will be given in view of FIG. 2.

The operation of terminal 2 will now be described with reference to FIG. 2.

Before the beginning of the reception of radio signal 6, terminal 2 receives information about which radio-frequency channel is going to be used for the reception of the radio signal.

From this received information, in step 90, scheduler 42 checks if the next radio-frequency channel that is going to be used belongs to table 52. If it does not, in step 92, the scheduler is set to omit the transmission of dummy data bursts.

Then, during the reception of radio signal 6, in step 94, scheduler 42 checks if there are real data bursts to be transmitted through bus 32. Real data bursts to be transmitted exist if either one of modules 36 and 38 wants to read or write data in memory 34.

If there are real data bursts to be transmitted through bus 32, in step 96, these real data bursts are transmitted through bus 32 as soon as the bus is free.

On the contrary, if in step 94, there is no real data burst to be transmitted through bus 32, the bus is kept idle so that the next real data burst transmission can occur as soon as a real data burst is triggered by either one of modules 36 and 38.

For example, at the end of step 96 or when the bus 32 is idle, in step 98, scheduler 42 checks if the radio signal reception started after step 92 has ended. If it has not, the method returns to step 94. If it has, the method returns to step 90.

Figure 3A:
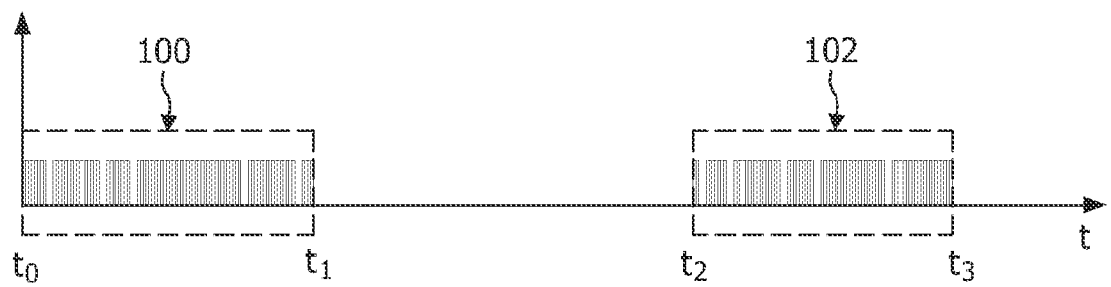

Therefore, as long as a radio signal is received on a radio-frequency channel that does not belong to table 52, the activity on bus 32 looks like the one illustrated in the time chart of FIG. 3A.

In FIG. 3A, the time chart shows a first data burst transmission 100 that takes place between times $t_0$ and $t_1$. Then, there is no more real data burst to be transmitted through bus 32 between times $t_1$ and $t_2$. Thus, during the time interval [$t_1$, $t_2$] bus 32 is idle.

At time $t_2$, a subsequent real data burst transmission 102 takes place from time $t_2$ to $t_3$.

Figure 3B:
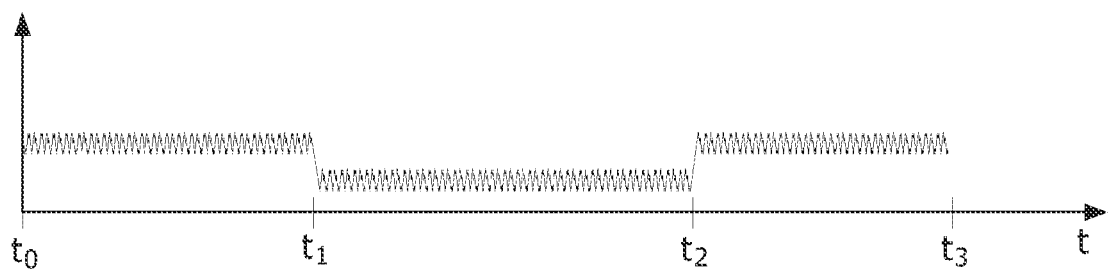

FIG. 3B shows the amplitude of the DC contribution caused by the transmission of bursts 100 and 102 through bus 32. From time $t_0$ to $t_1$, the DC contribution amplitude is high. At time $t_1$, the DC contribution amplitude abruptly drops to a low level. Then, between time $t_1$ to $t_2$, i.e. when the bus is idle, the DC contribution amplitude remains low. At time $t_2$, the DC contribution amplitude abruptly rises to the high level again and remains roughly constant from time $t_2$ to $t_3$. Module 20 efficiently cancels the DC contribution during time interval ]$t_0$; $t_1$[, ]$t_1$; $t_2$[ and ]$t_2$; $t_3$[ because during those time intervals, the energy of the generated noise remains roughly constant. However, at time $t_1$ and $t_2$, the noise energy abruptly changes and module 20 is not able to correctly cancel the noise at time $t_1$ and $t_2$. However, this is of no consequence because the noise that is not cancelled does not disrupt the radio-frequency channel that is currently used to receive the radio signal.

If in step 90 scheduler 42 determines that the next radio-frequency channel that is going to be used belongs to table 52, then, in step 110, scheduler 42 is set to execute a step 112 during which it schedules a continuous transmission of consecutive data bursts each data burst transmission generating noise of similar energy to the noise energy of the previous data burst transmission. Step 112 lasts as long as a radio signal is received on a radio-frequency channel belonging to table 52.

More precisely, at the beginning of the reception of the radio signal, in operation 114, scheduler 42 prioritizes the transmission of data bursts, so that real data bursts are always transmitted prior to dummy data bursts. For example, in operation 114, scheduler 42 checks if there are real data bursts to be transmitted through bus 32. If there are, in operation 116, manager 40 transmits the real data burst as soon as bus 32 is free. There is no significant time interruption between the transmission of two consecutive real data bursts. Significant is meant to be understood as that the time interruption is too short to produce a variation of the noise energy that corresponds to a noise energy gradient that is outside limits $S_L$ and $S_H$.

If in operation 114, scheduler 42 determines that there is no more real data burst to be transmitted, then, in operation 118, it controls generator 44 so that this generator produces a dummy data burst.

Then, in operation 120, as soon as the bus manager indicates that bus 32 is free, the dummy data burst is transmitted through bus 32 to stuff the time interval between two consecutive real data burst transmissions.

At the same time, in operation 120, manager 40 generates control signals through bus 60 so as to indicate that the currently transmitted data are dummy data. For example, the control signal transmitted through bus 60 during the transmission of a dummy data burst prevents the reading or the writing of any kind of data in memory 34 as well as the reception of any kind of data by modules 36 and 38.

Figure 4A:
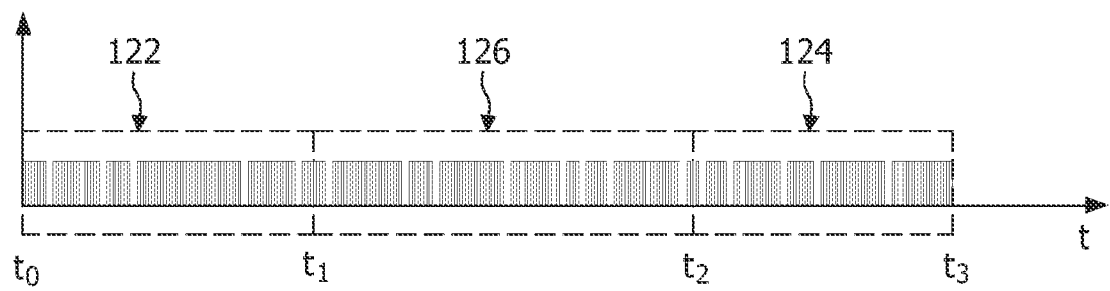
FIGS. 4A and 4B are also timing charts of data burst transmissions and the corresponding DC contributions.

The stuffing of dummy data bursts between real data bursts is illustrated in FIG. 4A.

FIG. 4A shows the transmission over bus 32 of two successive real data bursts 122 and 124. The transmission of burst 122 takes place between time $t_0$ and $t_1$ and the transmission of burst 124 takes place between time $t_2$ and $t_3$.

Due to step 118 and 120, during the time interval from time $t_1$ to $t_2$, manager 40 transmits a dummy data burst 126. The transmission of this dummy data burst 126 is arranged so that there is no substantial time interruption between the end of the transmission of burst 122 and the beginning of burst 126 as well as between the end of burst 126 and the beginning of burst 124. The term substantial has already been defined hereinabove.

Figure 4B:
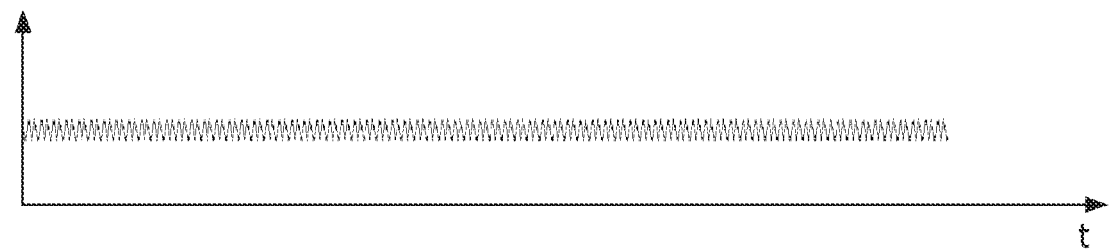

The resulting DC contribution amplitude is illustrated in FIG. 4B. As shown, the DC contribution amplitude remains roughly constant from time $t_0$ to $t_3$. Thus, module 20 remains permanently efficient to cancel the noise generated by bus 32 because the energy of this noise does not present any abrupt variations, contrary to what happens at time $t_1$ and $t_2$ in FIG. 3B.

Consequently, as can be understood, bus 32 generates noise but the generated noise has nearly no impact on the reception of the radio signal because this noise is efficiently cancelled by module 20.

At the end of operation 116 or 120, in operation 130, scheduler 42 checks if the reception of the radio signal has ended. If it has not, the method returns to operation 114. If it has, the method returns to step 90.

Many other embodiments are possible. Here, bus 32 has been described in the special case where it is only used to transmit information between a memory and a baseband processor. However, the above teaching also applies to a bus that is used by more than two electronic circuits.

The present description has been made in the particular case of an external bus that is used by at least two electronic circuits that are implemented on different dies. However, the present teaching can also be applied to an on-chip bus that links two or more on-chip electronic circuits etched on the same die.

Bus manager 40 can be an external device etched on a die different from the one used to etch the electronic circuits that communicate through the bus.

In a simple embodiment, the scheduler is permanently set to transmit dummy data bursts during time intervals when there is no real data burst to be transmitted. In this embodiment, the transmission of dummy data bursts can take place even if the radio-frequency channel used to receive the radio signal does not belong to table 52.

The present teaching does not only apply to a bus including distinct parallel wires to transmit control, data and address signals. It also applies to a serial bus where control, data and address signals are transmitted using common wires.

Finally, here, the two electronic circuits that use bus 32 have been illustrated in the particular case where one of them is a baseband processor and the other one is a memory. However, the present teaching also applies to a bus interconnecting to other circuits such as a processor and a co-processor.

The invention claimed is:

1. A radio telecommunication terminal comprising:
   a radio-frequency transceiver section able to receive a radio signal transmitted on a radio-frequency channel and to transform the received radio signal into a baseband signal, the radio-frequency transceiver section having a noise cancellation module able to efficiently cancel noise on the radio-frequency channel only if the noise energy gradient remains between a predetermined lower and upper limit,
   a baseband section to process the baseband signal, the baseband section having at least a digital data bus, two electronic circuits that transmit data bursts through the bus, and a bus manager able to indicate that the bus is busy as long as a data burst is being transmitted and to indicate that the bus is free for the transmission of a new data burst from the end of the previous data burst transmission, each data burst transmission generating noise of constant energy on the radio-frequency channel,
   wherein the baseband section also comprises a data burst scheduler able to schedule the continuous transmission of consecutive data bursts which generate noise of similar energy on the radio-frequency channel as long as the radio-frequency channel is used to receive the radio signal, the respective energy of the noise generated by the transmission of two consecutive first and second data bursts being similar only if the noise energy gradient between the end of the transmission of the first data burst and the beginning of the transmission of the second data burst is situated between the upper and lower limits.

2. The terminal according to claim 1, wherein the baseband section comprises a dummy data generator able to produce a dummy data burst which generates noise of similar energy to the noise of a real data burst when transmitted through the bus, and wherein the scheduler is designed to stuff time intervals during which there is no real data burst to be transmitted with dummy data burst transmissions so as to prevent abrupt drop or rise of noise energy at the end or at the beginning of a real data burst transmission as long as the radio-frequency channel is used to receive the radio signal.

3. The terminal according to claim 2, wherein the bus manager is able to generate control signals during the transmission of dummy data bursts that indicate to the electronic circuits that the transmitted data are dummy data.

4. The terminal according to claim 2, wherein the scheduler is designed to always schedule the transmission of real data bursts prior to the transmission of dummy data bursts.

5. The terminal according to any one of the preceding claims, wherein the scheduler is designed to stop scheduling continuous transmission of consecutive data bursts as soon as radio-frequency channels that are disrupted by the noise generated by the data burst transmissions are no longer used to receive the radio signal.

6. A method of decreasing the perturbation of a radio-frequency transceiver section caused by a baseband section having a data burst scheduler in a terminal, wherein the method comprises the step of scheduling the continuous transmission of consecutive data bursts which generate noise of similar energy on the radio-frequency channel as long as the radio-frequency channel is used to receive the radio signal, the respective energy of the noise generated by the transmission of two consecutive first and second data bursts being similar only if the noise energy gradient between the end of the transmission of the first data burst and the beginning of the transmission of the second data burst is situated between the upper and lower limits.

7. The method according to claim 6, wherein the method comprises the step of producing dummy data bursts, which generates noise of similar energy to that of a real data burst when transmitted through the bus, and the step of stuffing time intervals during which there is no real data burst to be transmitted with dummy data burst transmissions so as to prevent abrupt drop or rise of noise energy at the end or at the beginning of a real data burst transmission as long as the radio-frequency channel is used to receive the radio signal.

8. The method according to claim 7, wherein the method comprises the step of signaling the transmission of dummy data bursts to the electronic circuits.

9. The method according to claim 7, wherein the method comprises the step of prioritizing the transmission of the data bursts and to always assign the lowest priority to the dummy data bursts.

10. The method according to claim 6, wherein the method comprises the step of terminating the step of scheduling the continuous transmission of consecutive data bursts as soon as no radio-frequency channel susceptible to be disrupted by noise generated during the data burst transmission is used to receive the radio signal.

* * * * *

UNITED STATES PATENT AND TRADEMARK OFFICE
CERTIFICATE OF CORRECTION

| | | |
|---|---|---|
| PATENT NO. | : 7,983,634 B2 | Page 1 of 1 |
| APPLICATION NO. | : 12/162158 | |
| DATED | : July 19, 2011 | |
| INVENTOR(S) | : Perrin | |

It is certified that error appears in the above-identified patent and that said Letters Patent is hereby corrected as shown below:

Title Page
Item (75) inventors: Jean-Phillipe Perrin should be -- Jean-Philippe Perrin --

Signed and Sealed this
Fourth Day of October, 2011

David J. Kappos
*Director of the United States Patent and Trademark Office*